US012637156B2

(12) United States Patent
Nowack et al.

(10) Patent No.: US 12,637,156 B2
(45) Date of Patent: May 26, 2026

(54) FIFTH WHEEL HITCH WITH A REMOTELY-ENGAGING HANDLE

(71) Applicant: HORIZON GLOBAL AMERICAS INC., Plymouth, MI (US)

(72) Inventors: Curt Nowack, Plymouth, MI (US); Gregoire Mercier, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 539 days.

(21) Appl. No.: 18/083,753

(22) Filed: Dec. 19, 2022

(65) Prior Publication Data

US 2023/0406424 A1 Dec. 21, 2023

Related U.S. Application Data

(63) Continuation of application No. 16/615,870, filed as application No. PCT/US2018/034041 on May 23, 2018, now Pat. No. 11,530,005.

(Continued)

(51) Int. Cl.
*B60D 1/48* (2006.01)
*B62D 53/04* (2006.01)
(Continued)

(52) U.S. Cl.
CPC .............. *B62D 53/10* (2013.01); *B60D 1/48* (2013.01); *B62D 53/0807* (2013.01);
(Continued)

(58) Field of Classification Search
CPC .... B62D 53/10; B62D 53/08; B62D 53/0807; B62D 53/0842; B60D 1/015
See application file for complete search history.

(56) References Cited

U.S. PATENT DOCUMENTS

| 2,140,990 A | 12/1938 | Emrick |
| 2,833,558 A | 5/1958 | Fenster |

(Continued)

FOREIGN PATENT DOCUMENTS

| GB | 2343433 A | * | 5/2000 | ............. B62D 53/08 |

OTHER PUBLICATIONS

Patent Cooperation Treaty (PCT), International Search Report and Written Opinion for Application PCT/US2018/034041 filed May 23, 2018, mailed Aug. 28, 2018, International Searching Authority, US.

*Primary Examiner* — Kevin Hurley
(74) *Attorney, Agent, or Firm* — DAY PITNEY LLP; George N. Chaclas; Christopher J. Head

(57) ABSTRACT

A remotely-engaging handle for a fifth wheel hitch system is provided. The remotely-engaging handle may comprise a body and a latching assembly that may be securely attached to the body and capable of engaging with a fifth wheel hitch. The latching assembly may comprise a locking member and an actuating member. The actuation of the actuating member may position a portion of the locking member from an unlocked position to a locked position. The locking member may comprise a latching arm rotating about a pivot point and a biasing member operatively attached the body. The biasing member may bias the locking member into a transitory position. In one embodiment, the actuating member may further comprise an electrically-operated button or a software-based interface. In particular embodiment, the locking member may further actuated by a solenoid and the connecting member may further comprise a wireless device.

5 Claims, 9 Drawing Sheets

Related U.S. Application Data

(60) Provisional application No. 62/509,802, filed on May 23, 2017, provisional application No. 62/509,800, filed on May 23, 2017.

(51) Int. Cl.

| | |
|---|---|
| *B62D 53/08* | (2006.01) |
| *B62D 53/10* | (2006.01) |
| *B60D 1/01* | (2006.01) |
| *B60D 1/52* | (2006.01) |
| *B62D 53/00* | (2006.01) |

(52) U.S. Cl.
   CPC ............ *B62D 53/0842* (2013.01); *B60D 1/01* (2013.01); *B60D 1/52* (2013.01); *B62D 53/00* (2013.01); *B62D 53/04* (2013.01)

(56) References Cited

U.S. PATENT DOCUMENTS

| | | | | |
|---|---|---|---|---|
| 3,239,239 | A | 3/1966 | Worden | |
| 5,176,396 | A | 1/1993 | Hawthorne et al. | |
| 5,558,351 | A | 9/1996 | Hunter | |
| 5,988,666 | A | 11/1999 | Flater | |
| 6,092,825 | A | 7/2000 | Flater | |
| 6,402,176 | B1 | 6/2002 | Timmings | |
| 7,182,362 | B2 | 2/2007 | Yeakel | |
| 11,529,833 | B2 * | 12/2022 | Scruggs | ................. B60D 1/015 |
| 2011/0121540 | A1 | 5/2011 | Graber et al. | |
| 2015/0102583 | A1 | 4/2015 | Reimer | |

* cited by examiner

100 —

162

160

164

166

50

163

168 —

FIFTH WHEEL HITCH WITH A REMOTELY-ENGAGING HANDLE

CROSS-REFERENCE TO RELATED APPLICATION

This application is a continuation of U.S. Utility application Ser. No. 16/615,870 filed on Nov. 22, 2019, entitled "FIFTH WHEEL HITCH WITH A REMOTELY-ENGAGING HANDLE" which is a 35 U.S.C. § 371 national stage application of PCT Application No. PCT/US2018/034041 filed on May 23, 2018, entitled "FIFTH WHEEL HITCH WITH A REMOTELY-ENGAGING HANDLE", which claims priority to U.S. Provisional Patent Application No. 62/509,800, filed on May 23, 2017, entitled "Fifth wheel hitch engagement system," and U.S. Provisional Patent Application No. 62/509,802, filed on May 23, 2017, entitled "Fifth wheel hitch comfort system," which are all incorporated herein by reference in their entireties.

TECHNICAL FIELD

The present invention relates generally to a fifth wheel hitch, and more particularly, to a fifth wheel hitch assembly incorporating a remotely-engaging handle.

BACKGROUND

Fifth wheel hitches are used with a towing vehicle, such as a pick-up truck, to engage a towed vehicle for towing. In this context, the fifth wheel hitches involve universal products that are typically operated by untrained operators, and may be configured to connect trailers to pickup trucks for a load range of about 7,000 lbs. up to about 32,000 lbs. or even more.

Current fifth wheel hitches use a handle as a primary component to lock and/or unlock a kingpin to a fifth wheel. Some fifth wheel hitches use additional locking features to lock the handle in place such as for example a bail pin. In such cases, the bail pin may be in a different location other than the handle grip. Such fifth wheel hitches often requires the operators to perform one or more actions to unlock, particularly if handle is not self-latching. As a result, he untrained operators may become confused as to whether the hitch is fully released during uncoupling or fully secured during coupling.

In view of these shortcomings, there is a need for an improved engaging handle for use with the fifth wheel hitches to overcome the afore-mentioned shortcomings.

SUMMARY

A remotely-engaging handle for a fifth wheel hitch system is provided. The remotely-engaging handle may comprise a body and a latching assembly that may be securely attached to the body and capable of engaging with the fifth wheel hitch. The latching assembly may comprise a locking member and an actuating member in operative communication with the locking member. The actuation of the actuating member may position a portion of the locking member from an unlocked position to a locked position. The locking member may comprise a latching arm rotating about a pivot point and a biasing member operatively attached the body. The biasing member may bias the locking member into a transitory position. The actuating member may engage the connecting member to retract and extend the fifth wheel hitch.

In one embodiment, the actuating member may further comprise an electrically-operated button. In another embodiment, the actuating member may further comprise a software-based interface. In particular embodiment, the locking member may further actuated by a solenoid. In some embodiments, the connecting member may further comprise a wireless device.

In particular, a remotely-engaging handle according to certain embodiments may encompass any combination of the following features:

a body;

a latch assembly connected to the body proximate to a first end;

an actuating member connected to the body apart from the first end, wherein the actuating member selectively engages the latch assembly to lock and unlock a fifth wheel hitch positioned adjacent to the first end;

wherein the latch assembly includes a latching arm connected to a biasing member;

wherein the actuating member urges the latching arm to rotate about a pivot to engage or disengage a fifth wheel pin mounted on the fifth wheel hitch;

a power source;

wherein the latch assembly comprises a solenoid operatively controlled by the actuating member;

wherein the actuating member includes a software-based interface;

wherein the actuating member is remotely controlled by at least one system selected from a vehicle on-board diagnostic interface, a radio access network, wireless transmissions, a telecommunications system, a wireless device, and a smart phone;

wherein the actuating member is activated by movement of a lever mounted on the body;

wherein the movement of the lever drives a cable attached to the latching arm and/or biasing member;

wherein the lever is selectively locked in place with a lever pin; and wherein the engagement of the fifth wheel pin places the fifth wheel hitch in a closed position and disengagement of the fifth wheel pin places the fifth wheel hitch in an open or transitory position.

In addition, a fifth wheel hitch mounting system attachable to a vehicle and including any of the aforementioned embodiments of the remotely-engaging handle is also contemplated. Here, the additional features may encompass any combination of the following features:

a kingpin receiving jaw;

the remotely-engaging handle as described above; and wherein the actuating member selectively locks the jaw.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

BRIEF DESCRIPTION OF THE DRAWINGS

Operation of the present teachings may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein. In the drawings.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of this disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that the various embodiments described herein may include other components and/or functionality. It is further noted that while various embodiments refer to a fifth wheel hitch 50, various other systems may be utilized in view of embodiments described herein. Further, the present system may include a variety of components, not limited to the components discussed below. Optionally, the present system may include multiple units of the same components. In an embodiment, the present system may include just the fifth wheel hitch 50 described herein. Further, the present system may include components of each of the fifth wheel hitch 50 to create a combination of each feature of the various systems.

Figure 1:
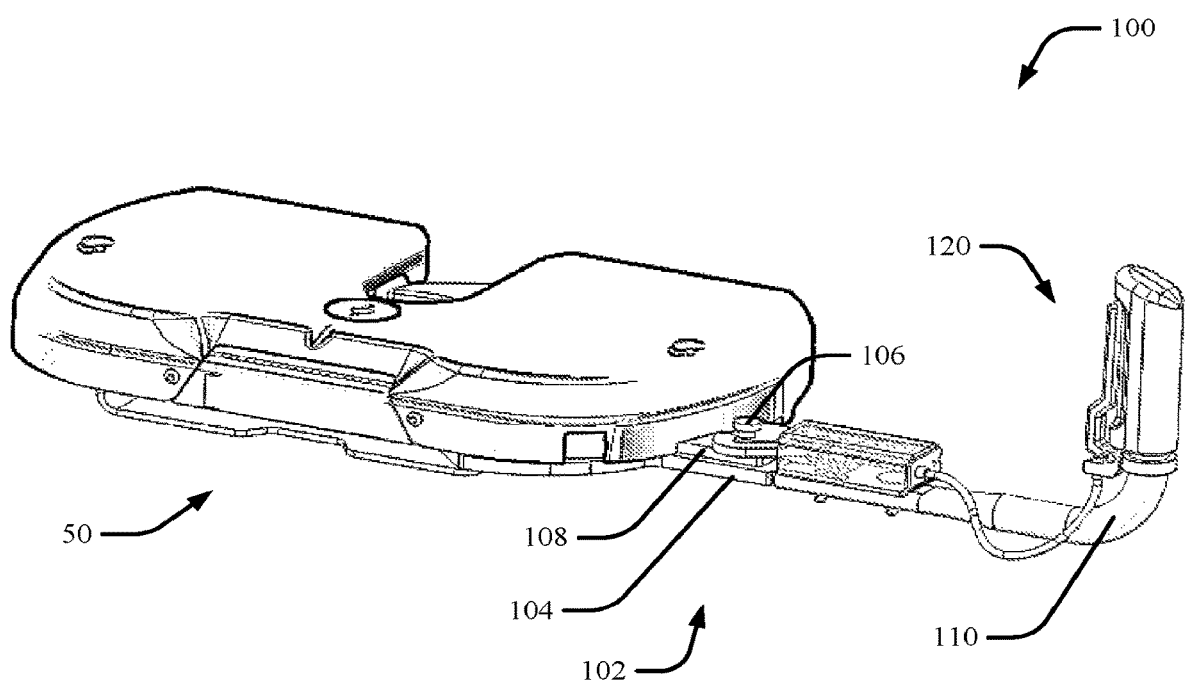
FIG. 1 is a perspective view of a non-limiting example of a remotely-engaging handle system for use with a fifth wheel hitch.

FIG. 1 illustrates a non-limiting exemplary embodiment of a remotely-engaging handle system 100 for use with a fifth wheel hitch as shown and described herein. The remotely-engaging handle system 100 may be securely engaged with the fifth wheel hitch 50. The remotely-engaging handle system 100 may include an elongated body 110 and a latching assembly 120. The remotely-engaging handle system 100 may be configured to allow the operator to remotely engage the kingpin 70 into a locked 202 and/or unlocked 204 positions (as shown in FIGS. 3A-7B), as well as ready-to-receive 206 position (as shown in FIG. 8), from the bedside of a towing vehicle.

The latching assembly 120 may be attached to the elongated body 110 for latching and/or unlatching a receiving member 102 that may be securely attached to a fifth wheel hitch head 104. By way of a non-limiting example, the receiving member 102 may include a latch pin 106 that may be securely attached to a fifth wheel hitch head base 108. The latch pin 106 may be secured by any appropriate means, such as with fasteners, welding or the like. It should be understood, however, that this is merely an exemplary embodiment and that the present system may apply to the receiving member 102. For the sake of brevity of the present disclosure, not every example is included, but the present application contemplates any such embodiments.

Figure 2:
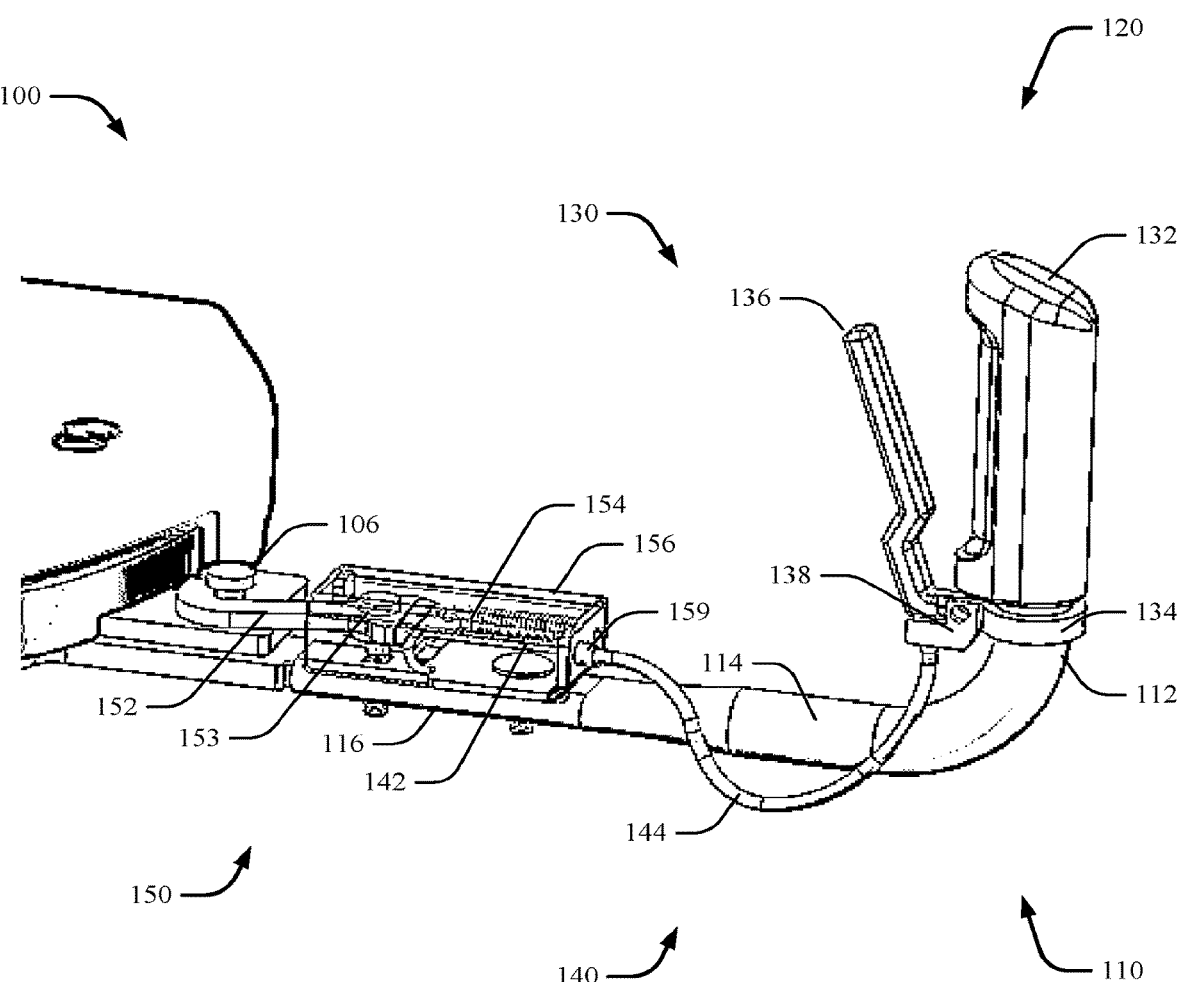
FIG. 2 is a perspective view of a non-limiting example of a remotely-engaging handle system in accordance with various embodiments described herein.
Figure 2:
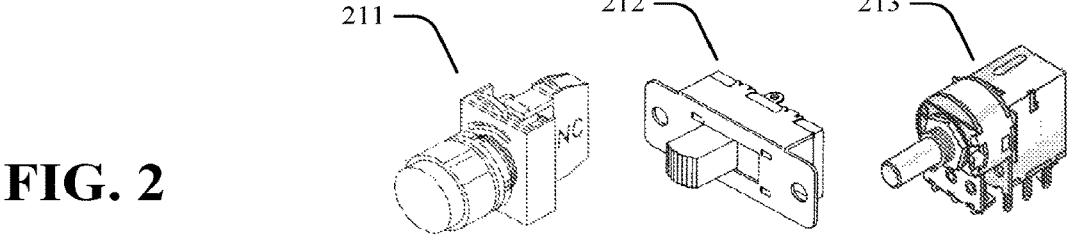

Referring to FIG. 2, the elongated body 110 may include a handle portion 112, a body portion 114 and an attachment portion 116. The elongated body 110 may be of any appropriate shape or size, such as having a generally tubular, square, rectangular, or the like shape, and may be sized to generally fit in the bed of the towing vehicle. In some embodiments, the elongated body 110 may be formed from a single generally continuous piece, such as a generally continuous and generally rectangular-shaped tubular member. By way of a non-limiting example, the elongated body 110 may be formed by stamping, which may create a generally smooth, reinforced, tubular structure.

The latching assembly 120 may also include an actuating member 130, a connecting member 140 and a latching member 150. The actuating member 130 may be generally configured to engage the connecting member 140 to allow for the movement of the latching member 150. The actuating member 130 may be selectively and operatively connected to the elongated body 110 at any appropriate position. By way of a non-limiting example, the actuating member 130 may be attached to the handle portion 112 of the elongated body 110. The actuating member 130 may also include a handle 132, a lever mount 134 and a lever 136.

The handle 132 may be a sleeve securely fixed to the elongated body 110. The handle 132 may be located at any appropriate position on the actuating member 130, such as at an end of the handle portion 112 of the elongated body 110. The handle 132 may provide the operator with a comfortable surface to grasp the actuating member 130. The handle 132 may be ergonomically shaped to further attempt to ease use of the actuating member 130. The handle 132 may be of any appropriate shape or size, such as having a generally tubular, square, rectangular, or the like shape. By way of a non-limiting example, the handle 132 may be formed by stamping, which may create a generally smooth, reinforced, tubular structure. The handle 132 may be manufactured of any appropriate material such as metal and/or elastomeric material. However, the handle 132 may be of any appropriate configuration and is not limited to the configuration shown.

The handle 132 may be secured to the elongated body 110 via the lever mount 134 that may be positioned in the handle portion 112 of the elongated body 110. The lever mount 134 may act as a guide for the lever 136. As the lever 136 rotates between engaged or disengaged (locked or unlocked) positions, the lever mount 134 permits movement along a predefined path so that the lever 136 may engage and disengage the fifth wheel hitch assembly 50 or more particularly, the latch pin 106 as appropriate.

The lever 136 may be securely attached to the handle 132 by the lever mount 134. The lever 136 may be rotatably attached to the lever mount 134 to allow the operator to remotely engage the kingpin 70 into a locked 202 and/or unlocked 204 positions from the bedside of the towing vehicle. The lever 136 may be rotatable about a lever pivot point 138 relative to the lever mount 134 and may be rotatable between released and/or engaged positions. The lever 136 may also include a lever profile 137 for an operator to easily grasp and press the lever 136. By way of a non-limiting example, the actuating member 130 may further include a button 211, a slider 212, a twisting knob 213 and/or other means of mechanically and/or electrically actuating the deploying component(s).

The connecting member 140 may include a cable 142 and cable bushing 144. The cable 142 may retract within or extend from the cable bushing 144. The actuating member 130 may engage a cable 142 to transfer rotation of the lever 136 to pivoting motion of the latching arm 152. Actuation of the lever 136 may cause the cable 142 to operably pivot the latching arm 152. The cable 142 may be securely attached with the latching arm 152. In such embodiments, one end of the cable 142 may be attached to the latching arm 152 and another end may be attached to the lever 136. By way of a non-example, the cable 142 may be securely attached by welding, fastener, or the like with the latching arm 152 and/or the lever 136. However, the cable 142 may be attached in any appropriate manner. The cable bushing 144 may be of any appropriate shape, such as by way of a non-limiting example, a generally round cross-sectional shape. In some embodiments, the cable bushing 144 may have a generally square, rectangular or other appropriate shape. The cable bushing 144 may be formed from any material, such as metal or plastic.

Figure 3A:
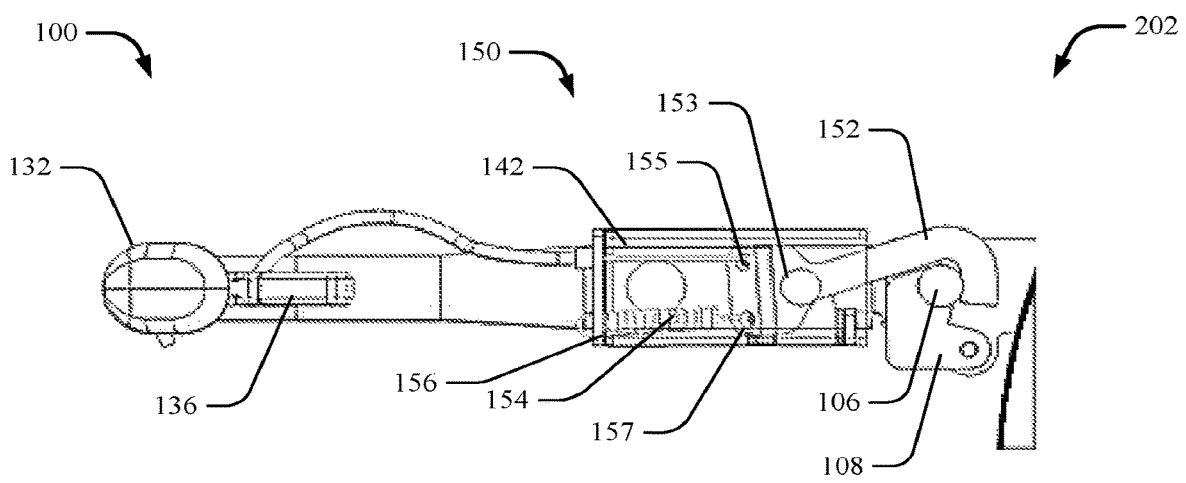
FIG. 3A is a top view of a remotely-engaging handle system in in a locked position.
Figure 3B:
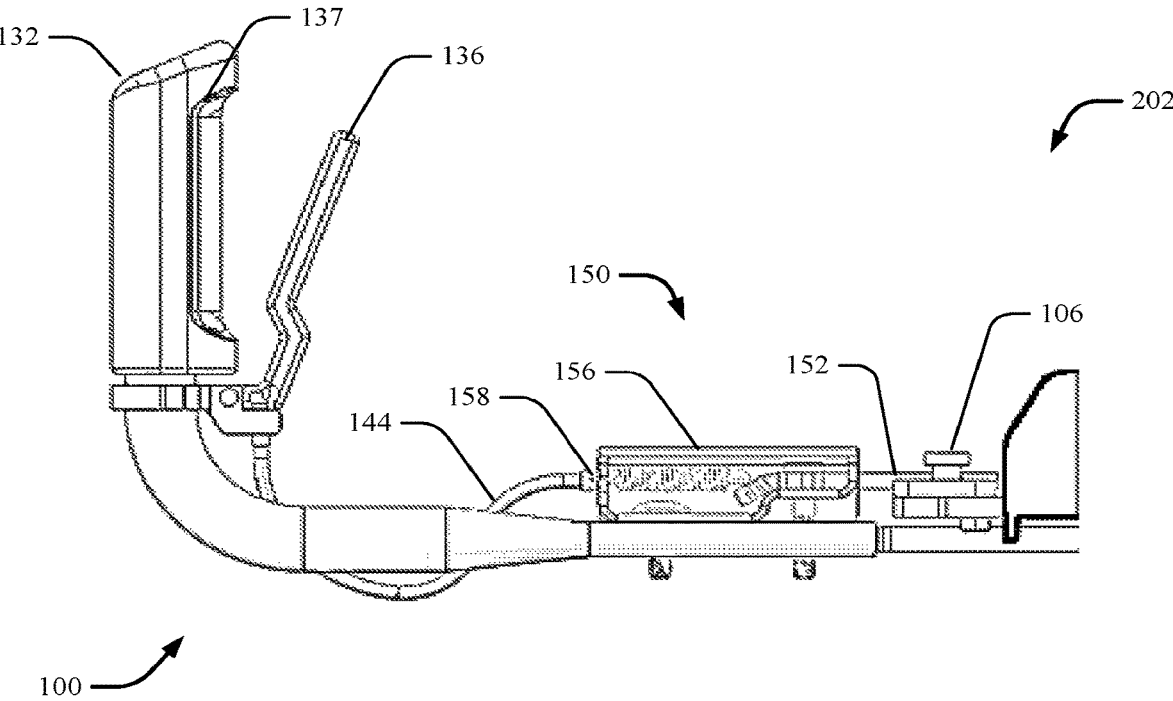
FIG. 3B is a side view of the embodiment of FIG. 3A.

With respect to FIGS. 3A and 3B, the latching member 150 may be selectively engaged with the latch pin 106. The latching member 150 may include a latching arm 152, an arm biasing member 154 and a latch arm housing 156. The latching arm 152 may be rotatably attached to the latch arm housing 156 such that the latching arm 152 may rotate about the latch pivot point 153. The latching arm 152 may be securely attached with the cable 142. In such embodiments, one end of the cable 142 may be attached to the latching arm 152 and another end may be attached to the lever 136.

The arm biasing member 154 may be attached to the latching arm 152 and may bias the latching arm 152 to a fully engaged position. In some embodiments, the arm biasing member 154 may comprise a spring, however, any appropriate biasing member may be utilized. In such embodiments, one end of the arm biasing member 154 or spring may be attached to the latch arm housing 156 and another end may be attached to the latching arm 152 at the second engagement portion 157 such as shown in FIG. 3A. The arm biasing member 154 may be attached in any appropriate matter such as through hooks or the like.

The latch arm housing 156 and the cable bushing 144 may be coupled together by a coupler 158. The coupler 158 may include a coupler aperture 159 through which the cable 142 may operatively pass. The coupler aperture 159 may be of a generally round shape and may be of a size that is similar to the size of an outer diameter of the cable bushing 144. However, the coupler aperture 159 is not limited to being round. It may also be rectangular, square or any other appropriate shape.

Figure 4:
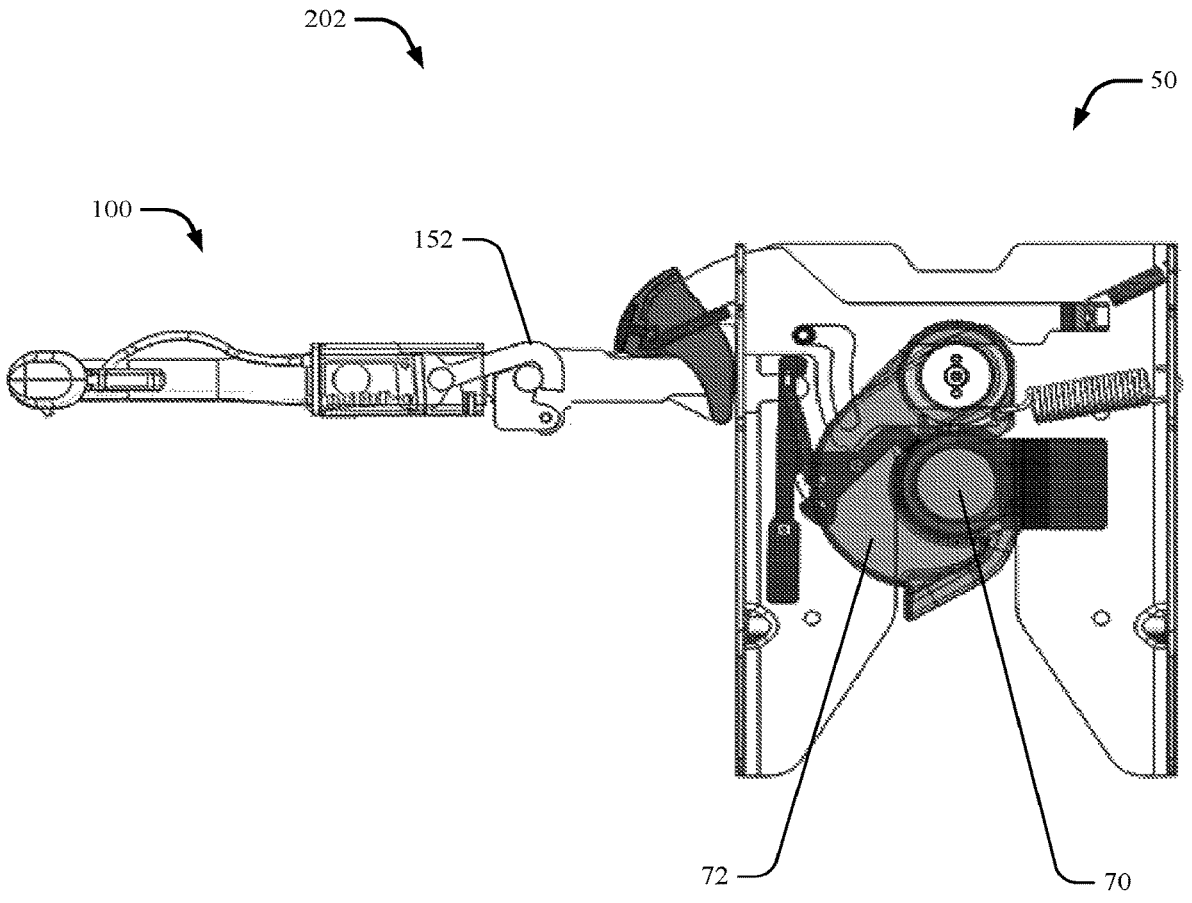
FIG. 4 is a top view of a remotely-engaging handle system for use with a fifth wheel hitch in a locked position described herein.

Disclosed herein the remotely-engaging handle system 100 is configured to change a position or configuration of the latching arm 152 to and from a locked (i.e., jaw 72 closed, kingpin 70 fully engaged) position 202 and an unlocked position 204 as shown in FIGS. 3A-8. FIGS. 3A-3B and 4 are perspective views of the hitch engagement handle system 100 that is in the locked position 202. In this configuration, the latching arm 152 may be engaged with the latch pin 106 preventing the fifth wheel hitch head base 108 from moving into the unlatched configuration. Specifically, the latching arm 152 may be biased toward the latching position by the arm biasing member 154.

Figure 5A:
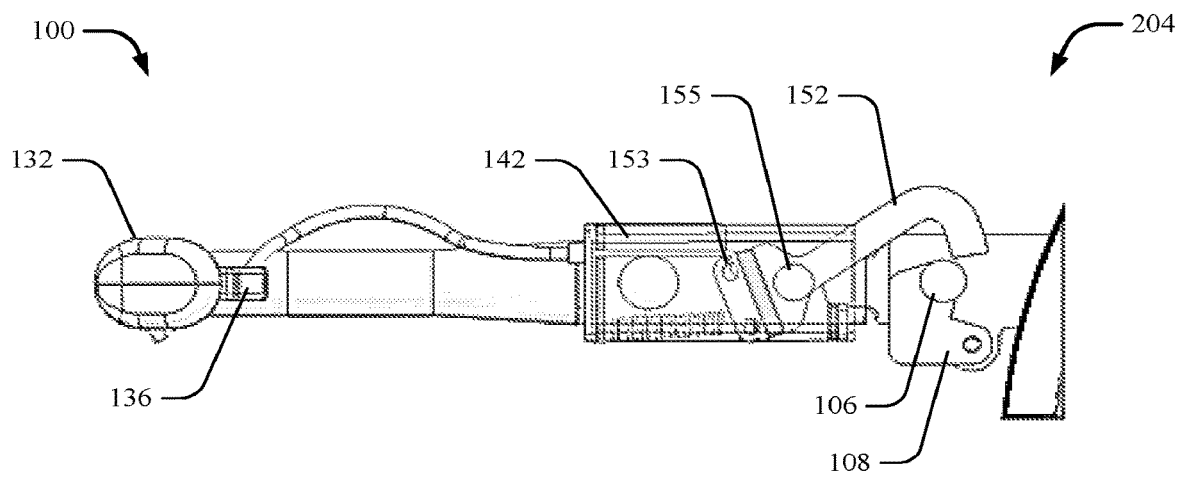
FIG. 5A is a top view of a remotely-engaging handle system in in an unlocked position.
Figure 5B:
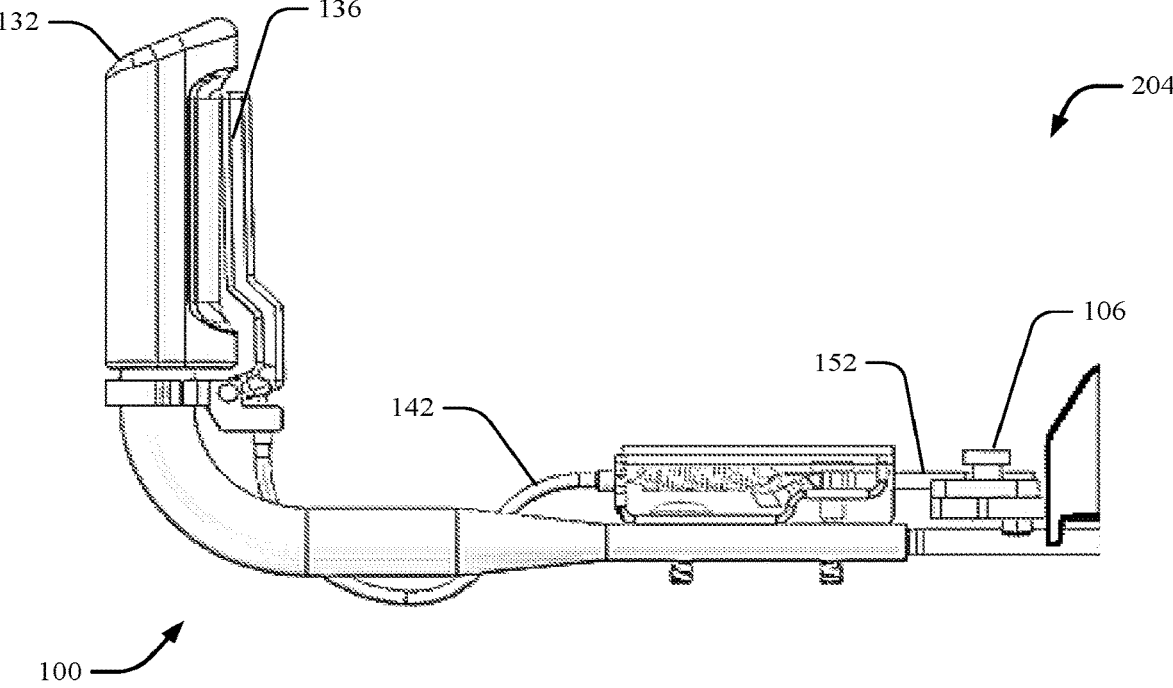
FIG. 5B is a side view of the embodiment of FIG. 5A.
Figure 6:
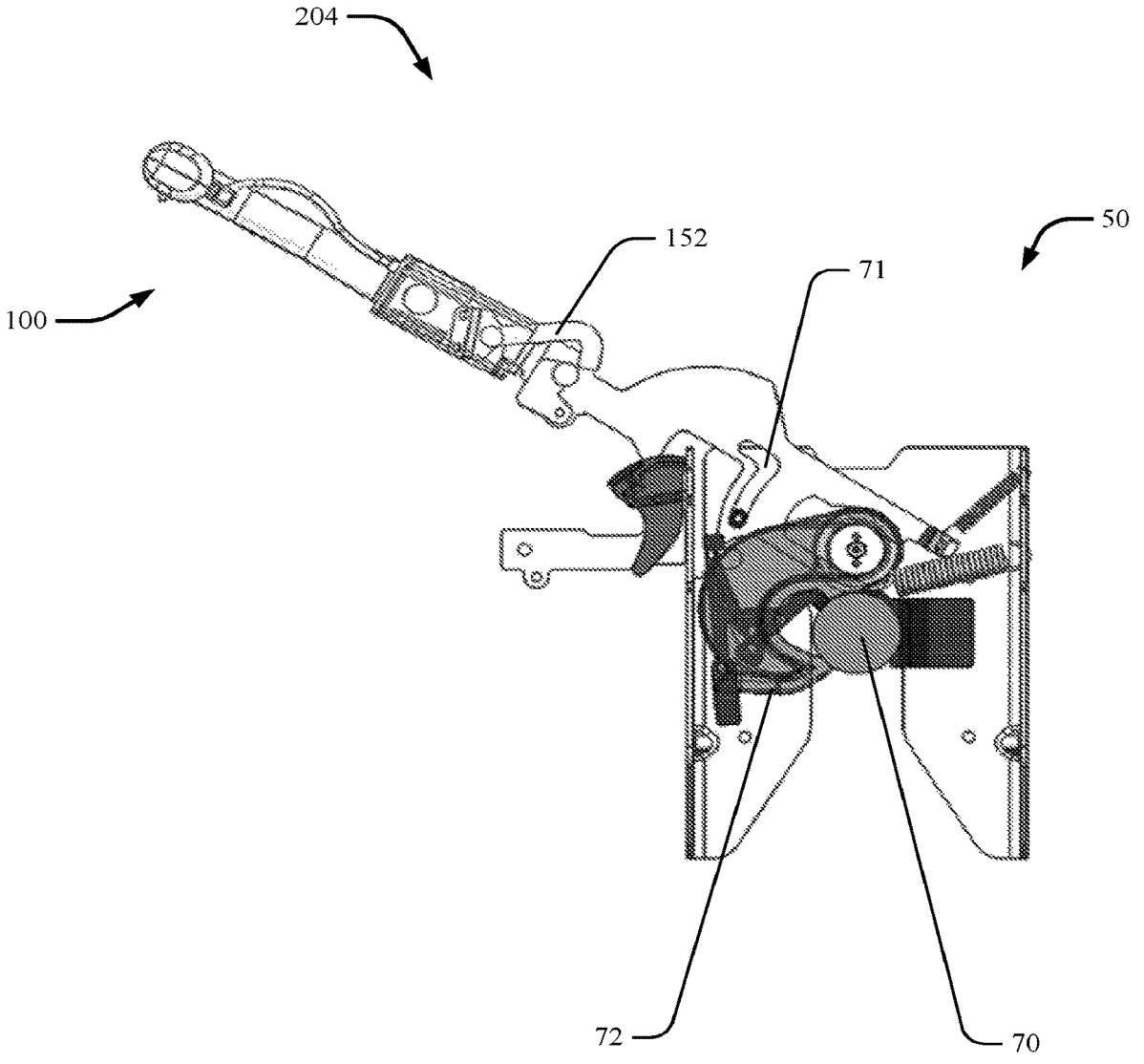
FIG. 6 is a top view of a remotely-engaging handle system for use with a fifth wheel hitch in a unlocked position described herein.

In operation as best shown in FIGS. 5A-5B and 6, when the operator pulls the lever 136 toward the handle 132, the lever 136 may pull the cable 142. As the cable 142 pulls the engagement portion 155 of the latching arm 152, the lever 136 will pivot the latching arm 152. As the lever 136 engages the cable 142, this will cause the latching arm 152 to pivot about the latch pivot point 153 to allow rotational movement. In such embodiment, the latching arm 152 of the remotely-engaging handle system 100 may be in the unlocked position 204. When unlocking, disengaging or unlatching, the remotely-engaging handle system 100 may be pulled out and rotated towards the front of the towing vehicle following the guide slot 71 such as for example shown in FIG. 6. This may allow the kingpin 70 to uncouple, disengage or unlock.

Figure 7A:
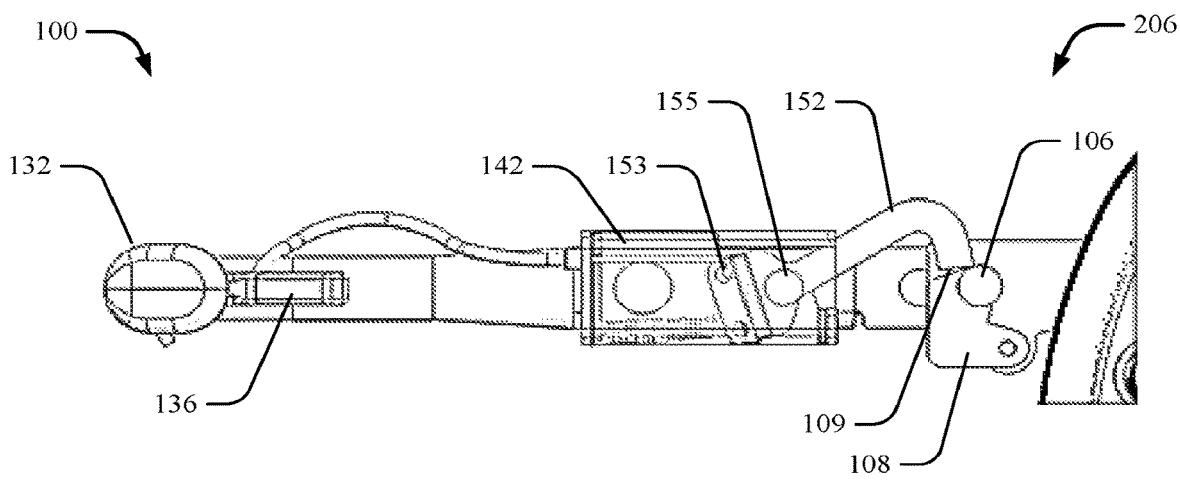
FIG. 7A is a top view of a remotely-engaging handle system in in a transitory position.
Figure 7B:
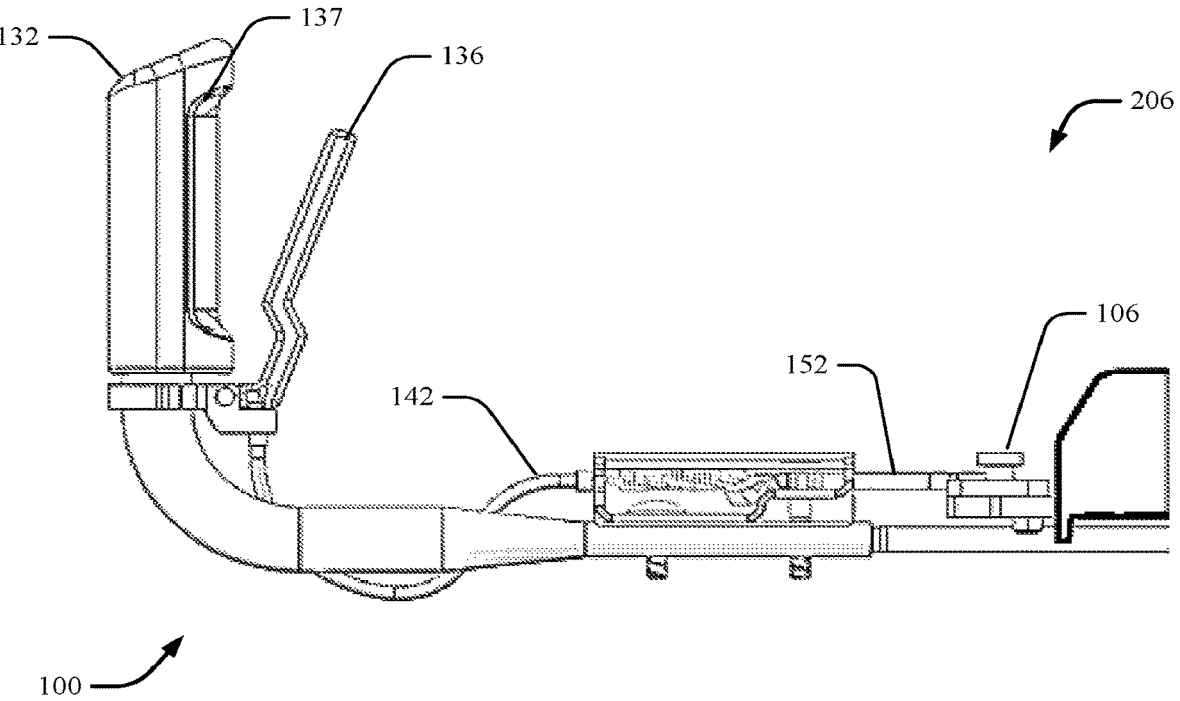
FIG. 7B is a side view of the embodiment of FIG. 7A.
Figure 8:
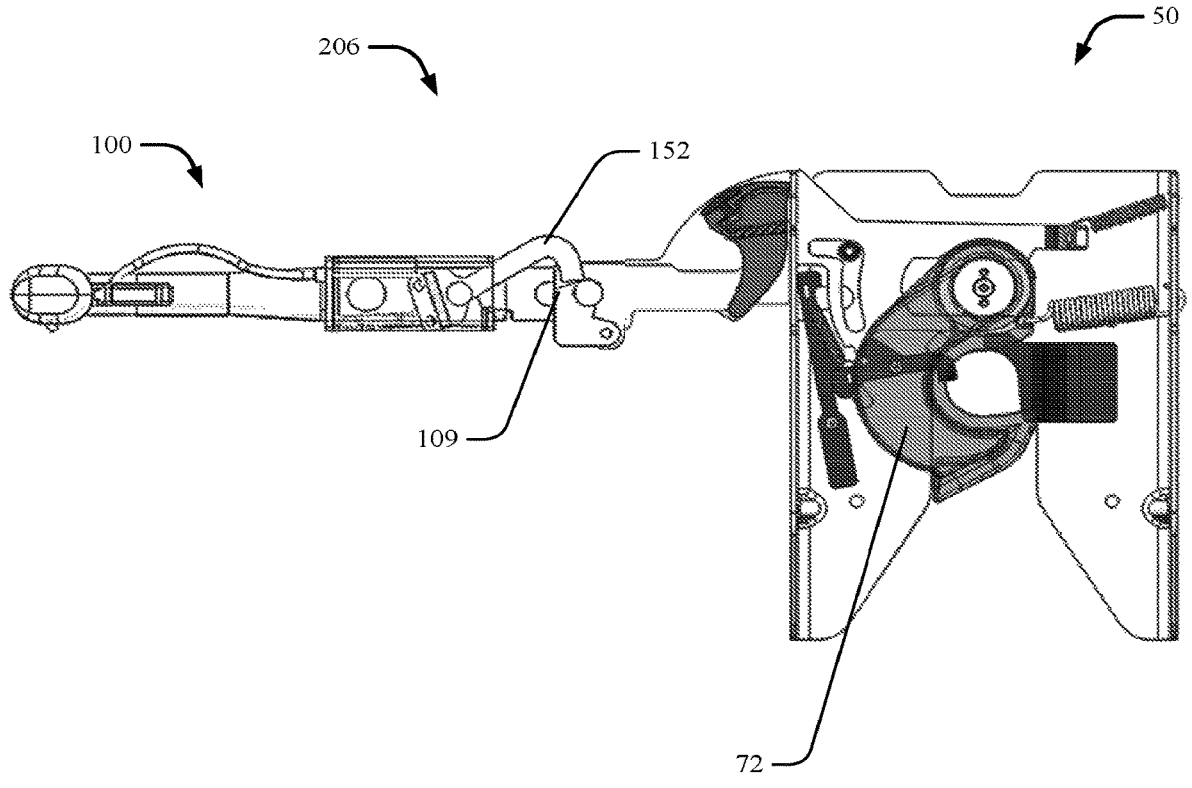
FIG. 8 is a top view of a remotely-engaging handle system for use with a fifth wheel hitch in a transitory position described herein.

With respect to FIGS. 7A and 7B, when the operator releases the lever 136, the latching arm 152 may be biased toward the resting portion 109 of the fifth wheel hitch head base 108. In the exemplary embodiment shown, latch springs 156 may bias the latching arm 152 toward the resting portion 109 of the fifth wheel hitch head base 108. The pivoting/rotation of the latching arm 152 may be positioned from the unlocked position to a transitory (i.e., ready-to-receive kingpin) position 206.

Figure 9:
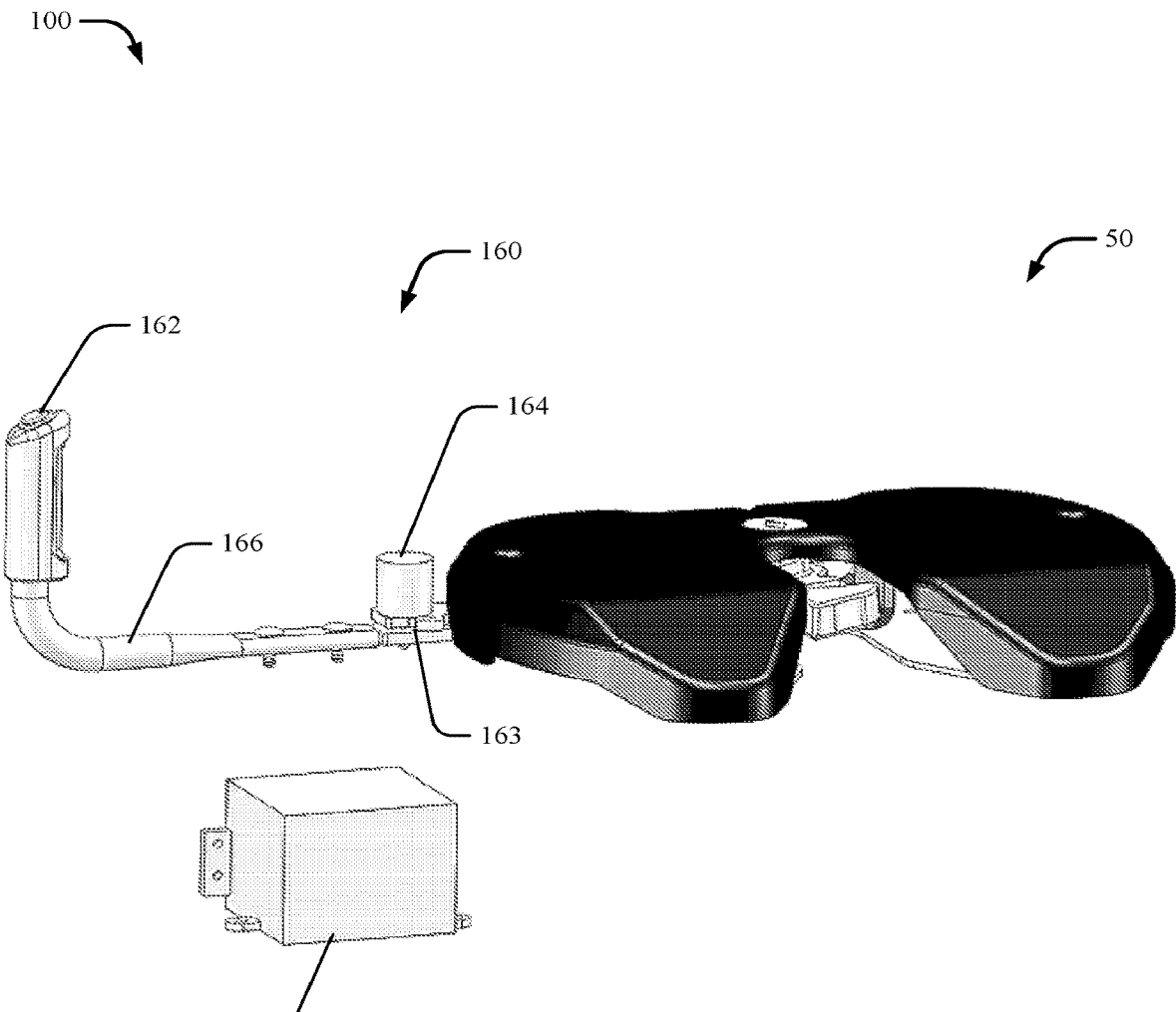
FIG. 9 is a perspective view of a non-limiting example of a remotely-engaging handle system using electromechanical interlock devices.

Further, in some embodiments shown in FIG. 9, the remotely-engaging handle system 100 may include electro-mechanical interlock devices 160. The interlock devices 160 may be of any appropriate construction and configuration. By way of a non-limiting example, the actuating member 130 may be a switch such as for example, a push button 162, and the latching member 150 such as for example, a lock pin 163, may be actuated by a solenoid 164 or by other suitable means. In such embodiments, the push button 162 may connected with an electrical wire 166 that may be positioned within the connecting member 140 to transfer electrical signal of the push button 162 to the lock pin 163. Both actuating member 130 and the latching member 150 may be connected with a power source 168 by the electrical wire 166. Actuation of the push button 162 may cause the solenoid 164 to retract the lock pin 163. The lock pin 163 may be any appropriate latching device such as hooks or the like. It should be understood, however, that this is merely an exemplary embodiment and that the present system may apply to any interlock devices 160. For the sake of brevity of the present disclosure, not every example is included, but the present application contemplates any such embodiments.

Further, the power source 168 may be of a substantially similar construction or may be different. As shown in FIG. 9, the power source 168 may be a 12 VDC battery. Further still, the connecting member 140 may be any appropriate wireless means. However, the present teachings are not limited to this configuration.

In operation, when the operator activates the push button 162 toward "ON" position, the push button 162 may activate the solenoid 164. As the solenoid 164 pulls the engagement portion 155 of the latching arm 152, the push button 162 will pivot the latching arm 152. As the push button 162 engages the cable 142, this will cause the latching arm 152 to pivot about the latch pivot point 153 to allow rotational movement. In such embodiment, the latching arm 152 of the remotely-engaging handle system 100 may be in the unlocked position 204.

When unlocking, disengaging or unlatching, the remotely-engaging handle system 100 may be pulled out and rotated towards the front of the towing vehicle following the guide slot 71 such as for example shown in FIG. 6. This may allow the kingpin 70 to uncouple, disengage or unlock.

The remotely-engaging handle system 100 may be further connected to an interface module (not shown here) to receive an operator input signal. The interface module may include a transceiver configured to transmit and receive information through a vehicle On-Board Diagnostics (OBD) in a wired or wireless configuration. The interface module may further be in operative communication by generating and wirelessly transmitting a signal to the receiving device such as a smart phone. Examples of such wireless configuration may include, but is not limited to, various radio access network (RAN), e.g., Wi-Fi, global system for mobile communications, universal mobile telecommunications systems, worldwide interoperability for microwave access, general packet radio service, third generation partnership project long term evolution (3G LTE), fourth generation long term evolution (4G LTE), third generation partnership project 2, BLUETOOTH®, ultra mobile broadband, high speed packet access, xth generation long term evolution, or another IEEE 802.XX technology. Furthermore, embodiments may utilize wired communications. The smart phone may display the sensor state to enable the operator to adjust the position at which the kingpin 70 comes into securely locked position.

Further, the various embodiments may be combined to be utilized on the remotely-engaging handle system operatively coupled with the fifth wheel hitch. Any combination of the embodiments disclosed above is contemplated to be utilized together. For the sake of brevity, not every combination is described in detail, but all such combinations are contemplated by this disclosure.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A remotely-engaging handle comprising:
   a body;
   a latching arm connected to the body;
   a lever connected to the body opposite the latching arm; and
   a cable connecting the latching arm and the lever;
   wherein movement of the lever or actuation of an actuating member selectively drives the cable and engages the latch.

2. The remotely-engaging handle of claim 1, wherein the latching arm is connected to a biasing member.

3. The remotely-engaging handle of claim 2, wherein the actuating member urges the latching arm to rotate about a pivot to engage or disengage a fifth wheel pin mounted on a fifth wheel hitch.

4. The remotely-engaging handle of claim 3, wherein the engagement of the fifth wheel pin places the fifth wheel hitch in a locked position and disengagement of the fifth wheel pin places the fifth wheel hitch in an unlocked position.

5. The remotely-engaging handle of claim 1, wherein the actuating member is selected from the group consisting of: a button, a slider, and a twisting knob.

* * * * *